Feb. 15, 1938.  A. G. O. ANDERSON  2,108,739
THUMB TACK
Filed Nov. 16, 1936
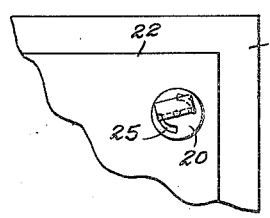
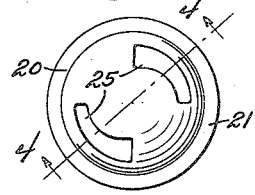
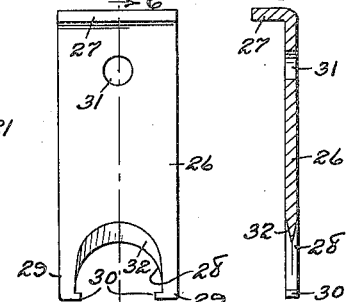
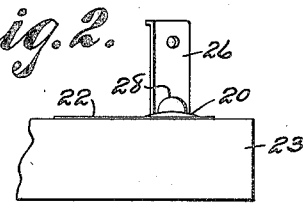
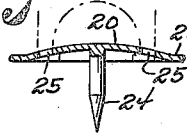
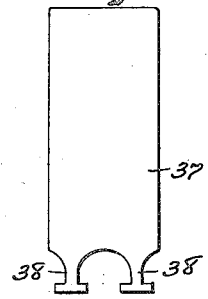
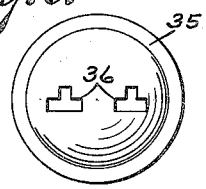
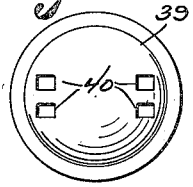
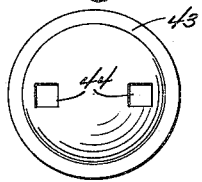
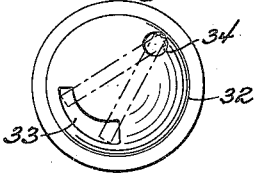
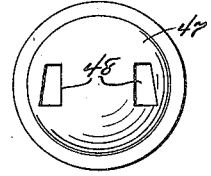
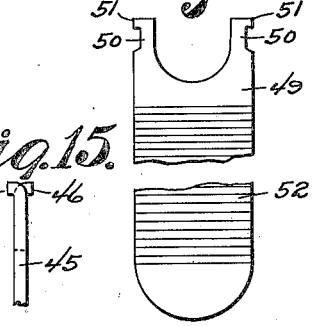
Arnold G. O. Anderson
INVENTOR
BY Victor J. Evans & Co.
ATTORNEYS Patented Feb. 15, 1938

2,108,739

UNITED STATES PATENT OFFICE 2,108,739

THUMB TACK

Arnold G. O. Anderson, Coscob, Conn.

Application November 16, 1936, Serial No. 111,135

2 Claims. (Cl. 85—16)

The object of the invention is to provide a thumb tack combination consisting of the tack and implement by which the latter may be readily extracted from a drawing board without the tendency to bend the spur or upset the latter's angular position with relation to the head; to provide a thumb tack with the head so formed that the extractor may engage the same within the periphery of the head, so that the extracting operation will be substantially in the direction of the length of the spur; and generally to provide a device of the kind indicated which is of simple form, susceptible of cheap manufacture, and of a construction that will insure the tack maintaining its proper shape throughout a long period of use.

With this object in view, the invention consists in a construction and combination of parts of which a preferred embodiment is illustrated in the accompanying drawing, wherein:

Figure 1 is a top plan view of a corner of a drafting board showing the improved thumb tack in place and the extractor in a position of removal for the same.

Figure 2 is a side elevational view of the structure of Figure 1.

Figure 3 is an enlarged plan view of the form of tack illustrated in Figure 1.

Figure 4 is a sectional view on the plane indicated by the line 4—4 of Figure 3.

Figure 5 is a front elevational view of the extractor used with the form of tack shown in Figure 3.

Figure 6 is a sectional view on the plane indicated by the line 6—6 of Figure 5.

Figure 7 is a top plan view of a modified form of tack, the position of the extractor being indicated in dot and dash lines.

Figure 8 is a top plan view of still another modified form of tack.

Figure 9 is an elevational view of the extractor used with the form of head shown in Figure 8.

Figure 10 is a plan view of still another modification of the improved tack.

Figure 11 is a front elevational view of the extractor used with the form of tack shown in Figure 10.

Figure 12 is an edge elevational view of the structure of Figure 11.

Figure 13 is a still further modification of the form of tack employed.

Figure 14 is an end elevational view of the extractor used with the tack of Figure 13.

Figure 15 is an edge elevational view of the structure of Figure 14.

Figure 16 shows still another modification of tack head.

Figure 17 is an elevational view of the extractor used with the form of tack shown in Figure 16.

The invention contemplates the use of a tack having a head of such form that a lifting tool may be interlocked with the head and by movement effect a pull longitudinally of the tack spur, so as to release it from a drawing board or wherever else the tack may be used. To this end, the tack is made with a domed head which, since it cannot contact throughout its undersurface with the paper, is made with a flat peripheral flange which constitutes a bearing element engaging the paper. In the form shown in Figure 1, the head 20 has the radiating flat flange 21 serving as the bearing element or engaging ring which contacts with the paper 22 on the board 23. The flange is not absolutely necessary to effective operation as a holding means but its use enhances the holding function of the tack. The spur 24, as is usual, is mounted at the center of the head and the latter on opposite sides of the center is formed with the arcuate slots 25. The slots are of progressively reduced width and are so arranged that the narrower end of the one is behind the wider end of the other. This progressive reduction of width is secured by forming the outer edges of the slots on arcs having their center at the center of the head and their inner edges on arcs having centers eccentric to the head center. This arrangement provides for the use of the lifting tool 26 which is in the form of a thin flat bar turned angularly at one end, as indicated at 27, and cut out at the other end, as indicated at 28, to provide oppositely disposed legs 29 whose centers are spaced a distance equal to the center spacing of the slots 25 at their wider end. The legs 29 are formed with inturned lug portions 30.

When the tack is attached to a drawing board, as in Figure 1, when its removal is desired, the lifter is applied with the lug ends passing through the wider ends of the slots 25. Then rotating the lifter on its center line as an axis, will cause the lugs 30 to pass under the head as the legs advance toward the narrower ends of the slots. There is thus a prying action between the legs and the tack head and the latter is loosened as a result, so that it may be removed.

The angular end 27 provides an arm to afford leverage in turning the extractor, while the hole 31 with which the extractor is provided, makes for its ready application to a key ring or the like.

Where the lifter is cut out, the stock is bevelled, as indicated at 32, to provide a knife edge to serve as the instrumentality for sharpening pencils and the like or for other convenient uses where a knife edge is desired.

In the tack head 32 shown in Figure 7, a slot 33 is provided identical with the slots 25 but diametrically opposite this slot the head is provided with a hole 34. In the hole 34 one of the legs of the lifter 26 is disposed, the other leg being passed through the slot 33. Then turning the lifter with the hole 34 as the center, will result in the slot received lug passing under the head, as the leg of the lug advances toward the narrower end of the slot. Thus the same kind of a pull will be imposed on the tack with the result that it will be readily removed.

In the modification shown in Figure 8 the head 35 is formed with a pair of tack slots 36 and the lifter 37 with the tack legs 38.

In the use of this form of the invention the lifter is applied by interlocking it with the tack head, the cross portions of the legs passing through the correspondingly arranged sections of the slots 36, after which the legs may be moved into the lateral sections of the slots so as to dispose the cross portions of the legs below the head, when a pull will result in the withdrawal of the tack.

In the form shown in Figure 10, the head 39 is formed with the spaced pairs of rectangular holes or openings 40 and the extractor with the legs 41, each of which has a hook or turned extremity 42. The hook extremities 42 may thus be inserted one in each of the openings 40 in each pair. At the time of the application of the hook extremities in the openings, the extractor will be in parallelism or substantial parallelism with the drawing board and the lifting operation is accomplished by rocking or swinging the extractor upward, when the hook will apply a lift to the tack head by engaging the undersides of the webs intervening between the two openings of each pair.

The modification shown in Figure 13 is generally like that of Figure 10 except that the head 43 is formed with a pair of diametrically disposed square openings 44. The extractor 45 for this form, instead of having the extremities of its legs made in hook form, has them turned angularly, as indicated at 46, but in opposite directions. These angularly arranged extremities may be engaged underneath the head after being passed through the openings 44, when the tack may be readily pulled from the board.

In the modification shown in Figure 16, the head 47 is formed with a pair of spaced slots 48 which are of progressively reduced width but whose axes are straight, or parallel, and not curved or arcuate as is the case with the slots 25. The extractor 49 for this form has the legs 50 formed with outward extending lugs 51, which may be inserted through the slots 48 at their wider ends and moved toward their narrower ends when they will engage underneath the tack head and elevate the tack. The extractor in this form is milled, as indicated at 52, to provide a firm hand grip and this milling may be carried out in the other forms of extractors.

The invention having been described, what is claimed as new and useful is:

1. A thumb tack for pulling with an extractor in which the latter is turned to pry the tack, said tack having a domed head and a slot adjacent its periphery, the slot being of progressively reduced width and having arcuate side edges of which the outer has its center at the center of the head and the inner its center eccentric to the head center, so that an extractor with a lateral lug may be inserted through the wider end of the slot and moved in the direction of the length of the slot to have the lug engage the underface of the head and lift the tack.

2. A thumb tack for pulling with an extractor in which the latter is turned to pry the tack, said tack having a domed head and diametrically positioned slots adjacent its periphery, the slots being of progressively reduced width and having arcuate side edges of which the outer have their centers at the center of the head and the inner their centers eccentric to each other and to the head center, so that an extractor having spaced legs with lateral lugs at their extremities may have the latter inserted through the wider ends of the slot to engage beneath the head on rotation of the extractor.

ARNOLD G. O. ANDERSON.